Patented June 17, 1952

2,600,386

UNITED STATES PATENT OFFICE 2,600,386

MALEATE-VINYL LAURATE COPOLYMERS

La Verne N. Bauer, Philadelphia, Harry T. Neher, Bristol, and William L. Van Horne, Philadelphia, Pa., assignors to Rohm & Haas Company, Philadelphia, Pa., a corporation of Delaware No Drawing. Application May 13, 1950, Serial No. 161,904

4 Claims. (Cl. 260—78.5)

This invention deals with copolymers of maleinoid esters (A) from a saturated aliphatic monohydric alcohol, ROH, in which R is an alkyl group having a carbon chain of 16 to 18 carbon atoms, and an unsaturated dibasic acid, $$HOOCC(X)=CHCOOH$$

wherein X is hydrogen, chlorine, or the methyl group, and vinyl laurate (B), the ratio of maleinoid ester (A) to vinyl laurate (B) copolymerized together being from about 10:90 to about 50:50 in parts by weight or percentage by weight. This invention also concerns compositions of matter consisting essentially of wax-containing hydrocarbon liquids having one of said copolymers dissolved therein in an amount sufficient to depress the pour point thereof.

It has been suggested to dissolve resinous products in hydrocarbon fluids for various purposes. Some oil-soluble resins increase the viscosity of oils in which they are dissolved. Some such solutions are improved in viscosity-temperature relationships. In many cases the pour points of such solutions remain unchanged. In some instances the pour point is raised. Lowering of pour points is occasionally obtained, but this effect is scarcely predictable.

Solutions of pure polymers such as polymers of dicetyl maleate, dioctadecyl fumarate, dioctadecyl citraconate, or dicetyl chloromaleate in wax-containing oils are found to have essentially the same pour point as oils free of polymer. This also holds for polyvinyl laurate. Mechanical mixtures of the two types of polymers are likewise ineffective in lowering pour points.

We have found, however, that copolymers of cetyl or stearyl maleinoid esters and vinyl laurate in the stated proportions are peculiarly effective pour point depressants in petroleum liquids which have waxy pour points.

The maleinoid esters are formed from long-chained monohydric alcohols of 16 to 18 carbon atoms in chain length. These are principally cetyl and stearyl alcohols or mixtures thereof. Heptadecyl alcohol, although not common, is likewise effective. The acid portion of these esters is that from maleic, fumaric, chloromaleic, citraconic, or mesaconic acids. There is thus used such an ester as dicetyl or distearyl maleate, fumarate, chloromaleate, or citraconate. There may likewise be used a mixed ester such as cetyl stearyl maleate or a mixture of esters.

The preparation of vinyl laurate, the second component of the copolymers of this invention, may follow known methods. Acetylene, for example, may be reacted with lauric acid in the presence of a zinc or cadmium catalyst. Vinyl laurate is also available through acidolysis or transesterification of a lower vinyl ester. The vinyl laurate need not be a pure material, as products obtained from commercial lauric acid are quite acceptable and useful.

The two types of esters, maleinoid ester and vinyl laurate, are mixed in proportions by weight of about 10 to 50 parts of the former to 90 to 50 parts of the latter. Within these proportions there are obtained copolymers of outstanding properties. The mixture is extended with an inert organic solvent such as benzene, toluene, xylene, or a close-cut naphtha or a mineral oil such as a lubricating oil and the solution subjected to polymerization conditions under an inert atmosphere. A copolymerizing catalyst is added to the solution and the solution is heated to temperatures between 75° and 150° C. until a copolymer results. The molecular size of the copolymer may be from about 1000 to 50,000 or more. The value of the copolymers as pour depressants, however, does not depend upon molecular size, but rather upon choice of starting materials and their proportions. The copolymers of molecular weights above about 5000 have not only pour depressing action but also act as thickening agents and improvers of viscosity index.

Useful catalysts for copolymerization are organic peroxides and acyclic azo compounds, such as azodiisobutyronitrile. A single peroxide may be used or a mixture of peroxides. Typical peroxides include acetyl peroxide, caproyl peroxide, lauroyl peroxide, benzoyl peroxide, dibenzal peroxide, di-tert.-butyl diperphthalate, tert.-butyl perbenzoate, 2,2-bis(tert.-butylperoxy)butane, methyl ethyl ketone peroxide, di-tert.-butyl peroxide, tert.-butyl-hydroperoxide, etc. Amounts of catalyst may be 2% to 15% of the weight of the mixed monomers. A small amount of catalyst may be taken at the start and more added as copolymerization proceeds.

Solvent may likewise be added from time to time. It is necessary to adjust the copolymerization so that copolymer remains in solution and it is formed. If a copolymer separates or a gel forms, it is usually found that the product is unsuitable as an oil additive.

Further details of preparing copolymers of this invention are presented in the following illustrative examples. Parts are by weight.

*Example 1*

A reaction vessel was prepared with a stirrer, reflux condenser, thermometer, dropping funnel, and inlet tube for inert gas. The vessel was heated with an oil bath. At the start the bath was kept at 115°–120° C. and a mixture of 15 parts of distearyl maleate, 85 parts of vinyl laurate, 5 parts of benzoyl peroxide, and 100 parts of toluene was added thereto. At 4.3 hours the temperature was lowered to 98°–99° C. and maintained at this level until 8.5 hours. At 3, 4.3, 5.3, and 6.3 hours additions of benzoyl peroxide were made in amounts of 2, 5, 2, and 0.8 parts respectively. Additions of 17, 22, and 110 parts of toluene were made at 3, 4.3, and 7.3 hours respectively. The product was a 32.5% solution of copolymer. A portion of this product was diluted with toluene to a 30% copolymer content. This solution had a viscosity of 5.4 centistokes at 100° F.

A mixture of 173 parts of the 32.5% solution, 121 parts of the 30% solution, and 139 parts of a light oil was heated to drive off toluene, being carried to 140° C./2 mm. The resulting solution contained 37.6% of copolymer in oil. This was a convenient form for handling the copolymer and adding it to wax-containing oils.

*Example 2*

A mixture was made from 100 parts of distearyl citraconate, 100 parts of vinyl laurate, 10 parts of benzoyl peroxide, and 100 parts of toluene. This mixture was slowly run into the reaction vessel, which had been flushed with nitrogen and heated to 115°–120° C. This temperature range was maintained for 3 hours and then the temperature was kept between 100° and 105° C. to the end of the heating period at 8 hours. Stirring was continued until the reaction mixture had cooled to 40° C. Catalyst was added as follows: at 3 hours, 4 parts; at 4.75 hours, 10 parts; at 5.75 hours, 4 parts; and at 6.75 hours, 1.5 parts. Toluene was added as follows: at 4.75 hours, 87 parts; at 5.75 hours, 87 parts; and at 6.75 hours, 87 parts. The product was a 35.3% solution of copolymer. A 30% solution of this copolymer in toluene had a viscosity of 36 centistokes at 100° F. In an oil having a pour point of +25° F., 0.5% of this copolymer depressed the pour point 50° F.

Repetition of the above procedure with substitution of distearyl mesaconate for the citraconate yields a copolymer with essentially the same properties. This copolymer is equally effective in depressing the pour points of wax-containing oils.

*Example 3*

A mixture of 50 parts of distearyl chloromaleate, 150 parts of vinyl laurate, 10 parts of benzoyl peroxide, and 200 parts of toluene was slowly added under a nitrogen atmosphere to the reaction vessel heated at 120° C. This temperature was maintained for four hours. The temperature was then lowered to 100° and kept at 100°–103° F. until 8 hours, when heating was discontinued. Peroxide was added in amounts of 4, 1, 4, and 1.5 parts at 2.75, 4.5, 5.5 and 6.5 hours respectively. Toluene was added at 7.5 hours in an amount of 175 parts. The batch was cooled with stirring. The product was a 35.8% solution of copolymer. A 30% solution in toluene had a viscosity of 7.1 centistokes at 100° F. It depressed the pour point of a wax-containing Pennsylvania neutral 40° F. when used at 0.25% therein.

*Example 4*

A mixture of 40 parts of dioctadecyl fumarate, 60 parts of vinyl laurate, 8.4 parts of lauroyl peroxide, and 25 parts of toluene was slowly run into the reaction vessel at 119° C. After three hours the temperature was reduced to about 105° C. and held at this level until 7.5 hours, when heating was discontinued. As usual, a nitrogen atmosphere was used and stirring was continued while the batch was being heated and thereafter until it had cooled below 40° C. Small portions of lauroyl peroxide were added at hourly intervals for a total of 15.2 parts. Additions of toluene amounted in all to 125 parts. This product was a 34.3% solution of copolymer. A 30% solution in toluene had a viscosity of 44 centistokes at 100° F.

*Example 5*

A mixture of 10 parts of dicetyl maleate, 90 parts of vinyl laurate, 5 parts of benzoyl peroxide, and 50 parts of toluene was added to the reaction vessel at 118° C., a temperature maintained for two hours after which temperatures of 100°–105° C. were held until 8 hours. Additions of portions of peroxide amounted to 10 parts in all and of toluene to 87 parts. The product was a 41% solution of copolymer. A 30% solution in toluene had a viscosity of 14.2 centistokes at 100° F. This copolymer depresses the pour point of Pennsylvania neutral having a normal pour point of +25° F. to −10° F. at 0.25%.

*Example 6*

A cetyl stearyl maleate was prepared using equal molecular amounts of cetyl alcohol and of stearyl alcohol. A mixture was made from 12 parts of this maleate, 88 parts of vinyl laurate, 5 parts of benzoyl peroxide and 75 parts of toluene. Copolymerization was started at 112° C. and continued at 98° C. until 8 hours. As above, peroxide was added in small portions, amounting in all to 9 parts and toluene was added in an amount of 75 parts. The product was a 37% solution of copolymer. A 30% solution in toluene had a viscosity of 76 centistokes at 100° F. This copolymer depresses the pour point of a Pennsylvania neutral having a normal pour point of +25° F. to −20° F. at 0.5% in Oil I.

The effect on the pour point of wax-containing hydrocarbons was determined by dissolving a defined copolymer in such hydrocarbon fluid in an amount sufficient to depress the pour point and subjecting the resulting solution to the A. S. T. M. pour test (D97—47). In some instances, this test was supplemented or replaced with shock chilling and/or maximum pour tests. Cf. Proc. A. S. T. M. 45, Appendix I, p. 244 (1945). The shock chilling determination is made by observing the sample during the initial cooling step with the cooling jacket at −60° F.

The useful range for using the copolymers of this invention in hydrocarbon fluids is from a concentration of about 0.01% up to about 5%. In any case, the amount of copolymer dissolved in a hydrocarbon of waxy pour point should be sufficient to depress the normal pour point of the said hydrocarbon.

For the evaluation of the copolymers three oils were selected. One was a 150 Pennsylvania neutral having a pour point of +25° F. (Oil I). This was an oil which proved to be relatively sensitive to the action of pour point depressants. A second oil (Oil II) was a 500 Mid-Continent solvent-extracted neutral (S. A. E. 30) having a pour point of +25° F. This was known to be an oil which was not readily changed as to its pour point. The third oil (Oil III) was selected to study effects in heavy oils. It was an S. A. E. 90 gear oil, compounded from 30 parts of a 180 Pennsylvania neutral and 70 parts of a 150 Pennsylvania bright stock. It had a pour point also of +25° F.

A copolymer prepared from 15 parts by weight of distearyl maleate and 85 parts of vinyl laurate was dissolved in Oil I at 0.5%, 0.25%, 0.1%, and 0.04%. These solutions gave pour points of −40° F., −35° F., −20° F., and 0° F. respectively. A 0.5% solution in Oil II gave a pour point of −25° F. by shock chilling and −5° F. by the maximum pour test. With 0.1% of this copolymer in Oil III the pour point was 0° F. and at 0.04%, +15° F.

A copolymer from 25 parts by weight of distearyl maleate and 75 parts of vinyl laurate was examined in Oil I at 0.5% and 0.25%. Pour points found were −35° F. and −25° F. respectively. In Oil II at 0.5% the pour point was −20° F. under shock chilling. In Oil III at 0.1% the pour point was −5° F. and at 0.04%, 0° F.

A copolymer from 35 parts of distearyl maleate and 65 parts of vinyl laurate was examined in Oil I at 0.25% and 0.1%. Pour points found were −20° F. and +10° F. At 0.5% in Oil II a pour point of −20° F. was found under shock chilling. In Oil III at 0.1% the pour point was −10° F. and at 0.04%, −5° F.

A copolymer from distearyl maleate and vinyl laurate in a 50:50 weight proportion gave pour points of −15° F., −15° F., −15° F., and −10° F. at 0.5%, 2.5%, 0.1%, and 0.04% respectively in Oil I. In Oil II at 0.5% the pour point was +5° F. In Oil III at 0.1% the pour point was −15° F. and at 0.04%, +15° F.

A copolymer of dioctadecyl fumarate and vinyl laurate in a 10:90 weight ratio gave pour points of −35° F., −35° F., −15° F., and +25° F. at 0.5%, 0.25%, 0.1%, and 0.04% respectively in Oil I. In Oil II the pour point by shock chilling was +5° F. at 0.5% and in Oil III +15° F. at 0.1%. A similar copolymer in a 5:95 ratio gave a pour point of +20° F. at 0.25% in Oil I and failed to depress the pour point of Oil II or Oil III, the ratio being by weight.

A copolymer of dicetyl citraconate and vinyl laurate in a 25:75 weight ratio gave a pour point of −40° F. in Oil I at 0.5% and −25° F. at 0.25%.

A copolymer of distearyl maleate and vinyl laurate in a 1:2.9 mole ratio (a 50:50 weight ratio) was carried to a molecular size such that a 30% solution in toluene had a viscosity of 181 centistokes at 100° F. This copolymer was examined over a range of concentration in an oil which had viscosities of 5.10 centistokes at 210° F. and 30.9 centistokes at 100° F., giving a viscosity index of 100. At 0.5% of copolymer in this oil viscosities were 5.41 centistokes at 210° F. and 32.9 centistokes at 100° F., yielding a viscosity index of 109. A 2% solution in the oil had viscosities of 6.48 centistokes at 210° F., and 39.3 centistokes at 100° F., giving a viscosity index of 124.

A copolymer of distearyl maleate and vinyl laurate in a 25:75 weight ratio was prepared in a molecular size such that a 30% solution thereof in toluene had a viscosity of 269 centistokes at 100° F. At 0.25% in Oil I it gave a pour point of −20° F.

This copolymer at 0.5% in the above oil having a viscosity index of 100 gave viscosities of 5.44 centistokes at 210° F. and 33.1 centistokes at 100° F., giving a viscosity index of 110. A 2% solution in the oil had viscosities of 6.62 centistokes at 210° F., and 40.1 centistokes at 100° F., giving a viscosity index of 125.

A copolymer from a mixture of dicetyl chloromaleate and vinyl laurate in a 15:85 mole ratio in Oil I at 0.5% gave a pour point of −20° F. and at 0.25% of −10° F. In Oil III at 0.1% it gave a pour point of −5° F.

The copolymers of this invention are new. They are characterized by their solubility in hydrocarbon fluids and their capacity for imparting thereto an increase in viscosity which is coupled with some improvement in viscosity index and lowering of pour point when the pour point results from a wax content. These copolymers are useful not only in petroleum lubricating oils having waxy pour points but also in fuel oils and diesel fuels and the like. The fluid hydrocarbons upon which these copolymers act are generally from paraffinic or naphthenic stocks. These copolymers may be used in conjunction with other additives, such as antioxidants, oiliness agents, detergents, and the like.

Compositions based on the copolymers of this invention dissolved in a wax-containing hydrocarbon liquid usually contain from 0.01% to 5% of the copolymer. There are some oils which are so susceptible to the action of the copolymers that a concentration of even 0.01% or 0.02% gives a practical depression of the pour point. Some oils advantageously may be treated with 5% or even more of one of these copolymers. This is particularly true in cases in which an increase in viscosity or an improvement in viscosity index is desired along with depression of pour point. In most cases concentrations of 0.05% to 2% of a copolymer are sufficient and highly effective for lowering the pour point and are preferred.

These copolymers may be used in conjunction with other polymeric materials and other types of oil-additives, such as antioxidants, wear-resisting agents, detergents, and the like.

We claim:

1. A copolymer of a maleinoid ester (A), ROOCC(X)=CHCOOR, in which X is a member of the class consisting of hydrogen, chlorine, and the methyl group, and R is an alkyl group having a carbon chain of 16 to 18 carbon atoms, and of vinyl laurate (B), the ratio of maleinoid ester groups (A) to vinyl laurate groups (B) being from 10:90 to 50:50 by weight.

2. A copolymer of distearyl maleate and vinyl laurate, the ratio of maleate groups to laurate groups being from 10:90 to 50:50.

3. A copolymer of dicetyl maleate and vinyl laurate, the ratio of maleate groups to laurate groups being from 10:90 to 50:50.

4. A copolymer of distearyl fumarate and vinyl laurate, the ratio of fumarate groups to laurate groups being from 19:90 to 50:50.

LA VERNE N. BAUER.
HARRY T. NEHER.
WILLIAM L. VAN HORNE.

REFERENCES CITED

The following references are of record in the file of this patent:

UNITED STATES PATENTS

| Number | Name | Date |
|---|---|---|
| 2,047,398 | Voss et al. | July 14, 1936 |
| 2,366,517 | Gleason | Jan. 2, 1945 |